(12) United States Patent
King et al.

(10) Patent No.: US 7,271,134 B2
(45) Date of Patent: Sep. 18, 2007

(54) WATER-BASED POLYMERS FOR USE AS FRICTION REDUCERS IN AQUEOUS TREATMENT FLUIDS

(75) Inventors: Karen L. King, Duncan, OK (US); David E. McMechan, Duncan, OK (US); Jiten Chatterji, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/300,615

(22) Filed: Dec. 13, 2005

(65) Prior Publication Data

US 2007/0135313 A1    Jun. 14, 2007

(51) Int. Cl.
*E21B 21/00*    (2006.01)

(52) U.S. Cl. ............... 507/226; 507/225; 507/261; 507/266

(58) Field of Classification Search ............ 507/225, 507/226, 261, 266
See application file for complete search history.

(56) References Cited

U.S. PATENT DOCUMENTS

| | | | | |
|---|---|---|---|---|
| 3,442,803 A | | 5/1969 | Hoover et al. ............. 252/8.44 |
| 3,562,226 A | | 2/1971 | Gayley et al. ............. 260/80.3 |
| 3,768,565 A | | 10/1973 | Persinski et al. .......... 166/308 |
| 4,432,881 A | * | 2/1984 | Evani ....................... 507/121 |
| 4,500,437 A | | 2/1985 | Engelhardt et al. ......... 507/225 |
| 4,694,046 A | * | 9/1987 | Bock et al. .............. 525/329.4 |
| 4,929,655 A | | 5/1990 | Takeda et al. .............. 524/458 |
| 5,006,590 A | | 4/1991 | Takeda et al. .............. 524/458 |
| 5,065,822 A | | 11/1991 | Miller et al. ................ 166/295 |
| 5,120,708 A | * | 6/1992 | Melear et al. ............. 507/126 |
| 6,169,058 B1 | | 1/2001 | Le et al. ..................... 507/222 |
| 6,454,008 B1 | | 9/2002 | Chatterji et al. ......... 166/308.6 |
| 6,531,531 B1 | | 3/2003 | Han et al. ................... 524/416 |
| 6,630,530 B1 | | 10/2003 | Han .......................... 524/442 |
| 6,784,141 B1 | | 8/2004 | King et al. ................. 507/222 |
| 2003/0045605 A1 | * | 3/2003 | Thompson ................. 523/130 |
| 2003/0125215 A1 | * | 7/2003 | Schwartz et al. ........... 507/121 |
| 2004/0058826 A1 | * | 3/2004 | Rayborn ..................... 507/100 |
| 2004/0200619 A1 | * | 10/2004 | Rae et al. ................... 166/307 |
| 2006/0116296 A1 | * | 6/2006 | Kippie et al. ............... 507/244 |
| 2006/0205605 A1 | * | 9/2006 | Dessinges et al. ......... 507/211 |

* cited by examiner

*Primary Examiner*—Margaret G. Moore
(74) *Attorney, Agent, or Firm*—Robert A. Kent; Fletcher, Yoder & Van Someren

(57) ABSTRACT

Disclosed are methods comprising providing an aqueous polymer dispersion comprising water, an anionic salt, a water-based friction reducing polymer, a polyol, an anionic surfactant, and a nonionic surfactant; mixing the aqueous polymer dispersion with additional water to form an aqueous treatment fluid; and introducing the aqueous treatment fluid into a subterranean formation. Also disclosed are methods comprising providing an aqueous treatment fluid comprising water, an anionic salt, a water-based friction reducing polymer in an amount sufficient to provide friction reduction without forming a gel, a polyol, an anionic surfactant, and a nonionic surfactant; and introducing the aqueous treatment fluid into a subterranean formation.

17 Claims, No Drawings

WATER-BASED POLYMERS FOR USE AS FRICTION REDUCERS IN AQUEOUS TREATMENT FLUIDS

CROSS-REFERENCE TO RELATED APPLICATIONS

The present invention is related to U.S. patent application Ser. No. 11/300,614, now allowed, entitled "Water-Based Polymers for Use as Friction Reducers in Aqueous Treatment Fluids," filed on the same date herewith, the entire disclosure of which is incorporated herein by reference.

BACKGROUND

The present invention relates to subterranean treatments, and more particularly, to water-based polymers as friction reducers in aqueous treatment fluids and associated methods.

During the drilling, completion, and stimulation of subterranean wells, aqueous treatment fluids are often pumped through tubular goods (e.g., pipes, coiled tubing, etc.). A considerable amount of energy may be lost due to friction between the aqueous treatment fluid in turbulent flow and the formation and/or tubular goods located within the well bore. As a result of these energy losses, additional horsepower may be necessary to achieve the desired treatment. To reduce these energy losses, friction reducing polymers have heretofore been included in aqueous treatment fluids. The use of friction reducing polymers should reduce the frictional losses due to friction between the aqueous treatment fluid in turbulent flow and the tubular goods and/or the formation.

An example of a stimulation operation that may utilize friction reducing polymers is hydraulic fracturing. Hydraulic fracturing is a process commonly used to increase the flow of desirable fluids, such as oil and gas, from a portion of a subterranean formation. In hydraulic fracturing, a fracturing fluid is introduced into a subterranean formation at or above a pressure sufficient to create or enhance one or more factures in the formation. Enhancing a fracture includes enlarging a pre-existing fracture in the formation. To reduce frictional energy losses between the fracturing fluid and/or the formation, friction reducing polymers may be included in the fracturing fluid. One type of hydraulic fracturing that may utilize friction reducing polymers is commonly referred to as "high-rate water fracturing." Unlike conventional fracturing fluids, fluids used in high-rate water fracturing generally do not contain a sufficient amount of a water-soluble polymer to form a gel. Gel formation is based on a number of factors including the particular polymer and concentration thereof, temperature, and a variety of other factors known to those of ordinary skill in the art. As a result, the fracturing fluids used in these high-rate water fracturing operations generally have a lower viscosity than traditional fracturing fluids. Additionally, while fluids used in high rate water fracturing may contain a friction reducing polymer, the friction reducing polymer is generally included in the fracturing fluid in an amount sufficient to provide the desired friction reduction without forming a gel.

However, the use of friction reducing polymers has proved challenging from an environment standpoint. For example, many of the friction reducing polymers that have been used previously are provided as oil-external emulsion polymers, wherein upon addition to the aqueous treatment fluid, the emulsion should invert releasing the friction reducing polymer into the fluid. The hydrocarbon carrier fluid present in the oil-external emulsion may pose environmental problems with the subsequent disposal of the treatment fluid. Among other reasons, disposal of hydrocarbons (e.g., such as the carrier fluid in the oil-external emulsion) may have undesirable environmental characteristics and/or may be limited by strict environmental regulations in certain areas of the world. Furthermore, the hydrocarbon carrier fluid present in the oil-external emulsion also may undesirably contaminate water in the formation.

SUMMARY

The present invention relates to subterranean treatments, and more particularly, to water-based polymers as friction reducers in aqueous treatment fluids and associated methods.

In one embodiment, the present invention provides a method comprising: providing an aqueous polymer dispersion comprising water, an anionic salt, a water-based friction reducing polymer, a polyol, an anionic surfactant, and a nonionic surfactant; mixing the aqueous polymer dispersion with additional water to form an aqueous treatment fluid; and introducing the aqueous treatment fluid into a subterranean formation.

Another embodiment of the present invention provides a method comprising: providing an aqueous treatment fluid comprising water, an anionic salt, a water-based friction reducing polymer in an amount sufficient to provide friction reduction without forming a gel, a polyol, an anionic surfactant, and a nonionic surfactant; and introducing the aqueous treatment fluid into a subterranean formation.

Another embodiment of the present invention provides a method of fracturing a subterranean formation comprising: providing an aqueous polymer dispersion comprising water, an anionic salt, a water-based friction reducing polymer, a polyol, an anionic surfactant, and a nonionic surfactant, wherein the water-based friction reducing polymer is a copolymer comprising acrylamide and acrylic acid, and mixing the aqueous polymer dispersion with additional water to form an aqueous treatment fluid, wherein the water-based friction reducing polymer is present in the aqueous treatment fluid in an amount sufficient to reduce friction without forming a gel; and introducing the aqueous treatment fluid into the subterranean formation at or above a pressure sufficient to create one or more fractures in the subterranean formation.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to subterranean treatments, and more particularly, to water-based polymers as friction reducers in aqueous treatment fluids and associated methods. While the compositions and methods of the present invention may be suitable for use in a variety of subterranean treatments where reduced friction is desired, they are particularly useful in high-rate water fracturing.

As used herein, the term "treatment," or "treating" refers to any subterranean operation that uses a fluid in conjunction with a desired function and/or for a desired purpose. The term "treatment," or "treating," does not imply any particular action by the fluid.

I. Example Aqueous Polymer Dispersions

The water-based friction reducing polymers used in methods and compositions of the present invention are generally provided in aqueous polymer dispersions that comprise water, a water-based friction reducing polymer, an anionic salt, a polyol, an anionic surfactant, and a nonionic surfactant. The term "friction reducing polymer," as used herein, refers to a polymer that reduces frictional losses due to friction between an aqueous fluid in turbulent flow and tubular goods (e.g. pipes, coiled tubing, etc.) and/or the formation. The term "polymer," as used herein, is intended to include both the acid form of the polymer as well as its various salts.

Aqueous polymer dispersions suitable for use in the present invention are generally prepared by solution polymerization. Suitable aqueous polymer dispersions and methods for their preparation are described in U.S. Pat. No. 6,531,531, the disclosure of which is incorporated herein by reference. An example of a suitable aqueous polymer dispersion is available from Green Technology Inc., Korea.

In accordance with the methods and compositions of the present invention, molecules of the water-based friction reducing polymers are generally dispersed in an aqueous anionic salt solution. Suitable water-based friction reducing polymers should, among other things, reduce energy losses due to friction in the aqueous treatment fluids of the present invention. For example, friction reducing polymers suitable for use in the present invention may reduce energy losses during introduction of the aqueous treatment fluid into a well bore due to friction between the treatment fluid in turbulent flow and the formation and/or tubular good(s) (e.g., a pipe, coiled tubing, etc.) located in the well bore.

Any water-based friction reducing polymer suitable for use in subterranean applications may be suitable for use in the present invention. An example of a suitable water-based friction reducing polymer comprises acrylamide. In some embodiments, polymer comprising acrylamide may be partially hydrolyzed acrylamide. As used in this disclosure, "partially hydrolyzed acrylamide" refers to acrylamide wherein in the range of from about 3% to about 70% of the amide groups have been hydrolyzed to carboxyl groups. An example of a suitable water-based friction reducing polymer comprising acrylamide is a copolymer comprising acrylamide and acrylic acid. The term "copolymer," as used herein, is not limited to polymers comprising two types of monomeric units, but includes any combination of monomeric units, e.g., terpolymers, tetrapolymers, and the like. Suitable water-based friction reducing polymers may further comprise additional monomers, such as 2-acrylamido-2-methylpropane sulfonic acid, N,N-dimethylacrylamide, vinyl sulfonic acid, N-vinyl acetamide, N-vinyl formamide, itaconic acid, methacrylic acid, diallyl dimethyl ammonium chloride, and combinations thereof.

In some embodiments, the acrylamide may be present in the water-based friction reducing polymers in an amount in the range of from about 5% to about 100% by weight of the polymer. In some embodiments, the acrylamide may be present in the water-based friction reducing polymers in an amount in the range of from about 50% to about 95% by weight of the polymer. In some embodiments, the acrylamide may be present in the water-based friction reducing polymers in an amount in the range of from about 60% to about 90% by weight of the polymer. In some embodiments, the acrylamide may be present in the water-based friction reducing polymers in an amount of about 70% by weight of the polymer.

As previously mentioned, the water-based friction reducing polymers further may comprise acrylic acid. In some embodiments, the acrylic acid may be present in the water-based friction reducing polymers in an amount in the range of from about 5% to about 95% by weight of the polymer. In some embodiments, the acrylic acid may be present in the water-based friction reducing polymers in an amount in the range of from about 5% to about 50% by weight of the polymer. In some embodiments, the acrylic acid may be present in the water-based friction reducing polymers in an amount in the range of from about 10% to about 40% by weight of the polymer. In some embodiments, the acrylic acid may be present in the water-based friction reducing polymers in an amount in the range of from about 20% to about 40% by weight of the polymer. In some embodiments, the acrylic acid may be present in the water-based friction reducing polymers in an amount of about 30% by weight of the polymer.

As previously mentioned, the water-based friction reducing polymers further may comprise an additional monomer, such as 2-acrylamido-2-methylpropane sulfonic acid, N,N-dimethylacrylamide, vinyl sulfonic acid, N-vinyl acetamide, N-vinyl formamide, itaconic acid, methacrylic acid, diallyl dimethyl ammonium chloride, and combinations thereof. In some embodiments, the additional monomer may be present in the water-based friction reducing polymers in an amount in the range of from about 0% to about 20% by weight of the polymer.

The water-based friction reducing polymers should have a molecular weight sufficient to provide a desired level of friction reduction. Generally, water-based friction reducing polymers having higher molecular weights may be needed to provide a desirable level of friction reduction. For example, in some embodiments, the average molecular weight of the water-based friction reducing polymers may be in the range of from about 7,500,000 to about 20,000,000, as determined using intrinsic viscosities. Those of ordinary skill in the art will recognize that water-based friction reducing polymers having molecular weights outside the listed range may still provide some degree of friction reduction in an aqueous treatment fluid.

The amount of the water-based friction reducing polymer present in the aqueous polymer dispersion depends on a number of factors, including the molecular weight of the polymer, the nature of the polymer, and the polymerization technique and conditions used to prepare the aqueous polymer dispersion. In some embodiments, the water-based friction reducing polymer may be present in the aqueous polymer dispersion in an amount in the range of from about 5% to about 30% by weight of the dispersion.

The anionic salt is generally included in the aqueous polymer dispersion to, among other things, inhibit hydration of the water-based friction reducing polymers. Generally, the hydration of the water-based friction reducing polymers should be inhibited so that the polymers do not undesirably hydrate prior to mixing the aqueous polymer dispersion with additional water. Among other things, undesirable hydration prior to mixing with the additional water would result in an aqueous polymer dispersion having increased viscosity. The aqueous polymer solution preferably should not be excessively viscous so that it can be easily handled and/or have reduced costs of transportation. Any anionic salt may be used that is capable of providing the desired hydration inhibition. Examples of suitable anionic salts include ammonium sulfate, ammonium chloride, potassium chloride, sodium sulfate, magnesium sulfate, aluminum sulfate, and combinations thereof. Generally, the anionic salt should be included in the aqueous polymer dispersion in an amount sufficient to inhibit the hydration of the water-based friction reducing polymers.

The aqueous polymer dispersion further comprises a polyol. Among other things, the glycerin may be included in the aqueous polymer dispersion to reduce the pour point thereof. Examples of suitable polyols include, but are not limited to, glycerin, propylene glycol, ethylene glycol, and combinations thereof. The polyol generally may be included in the aqueous polymer dispersion in an amount sufficient to provide the desired pour point reduction. In some embodiments, the polyol may be present in an amount in the range of from about 0.01% to about 0.5% by weight of the dispersion. In some embodiments, the polyol may be present in an amount in the range of from about 0.1% to about 0.3% by weight of the dispersion.

The nonionic surfactant is generally included in the aqueous polymer dispersion to stabilize the molecules of the water-based friction reducing polymer that are dispersed in the aqueous polymer dispersion. An example of a suitable nonionic surfactant comprises a polyester polyol. Other suitable nonionic surfactants include aliphatic alcohols esters and aromatic alcohol esters. Combinations of suitable nonionic surfactants also may be used. The nonionic surfactant generally may be included in the aqueous polymer dispersion in an amount sufficient to provide the desired stabilization. In some embodiments, the nonionic surfactant may be present in an amount in the range of from about 0.001% to about 0.5% by weight of the dispersion. In some embodiments, the nonionic surfactant may be present in an amount in the range of from about 0.001% to about 0.1% by weight of the dispersion. In one embodiment, the nonionic surfactant may be present in an amount of about 0.1% by weight of the dispersion.

The anionic surfactant is generally included in the aqueous polymer dispersion to stabilize the molecules of the water-based friction reducing polymer that are dispersed in the aqueous surfactant. An example of a suitable anionic surfactant comprises an ammonium salt of polyacrylic acid. Other suitable anionic surfactants include an ammonium salt of a 2-acrylamido-2-methylpropane sulfonic acid/acrylic acid copolymer. Combinations of suitable anionic surfactants also may be used. The anionic surfactant generally may be included in the aqueous polymer dispersion in an amount sufficient to provide the desired stabilization. In some embodiments, the anionic surfactant may be present in an amount in the range of from about 0.001% to about 0.5% by weight of the dispersion. In some embodiments, the anionic surfactant may be present in an amount in the range of from about 0.001% to about 0.3% by weight of the dispersion. In one embodiment, the anionic surfactant may be present in an amount of about 0.3% by weight of the dispersion.

Those of ordinary skill in the art will recognize that the aqueous polymer dispersion further may contain additional additives such as dispersants, initiators, activators, bases, combinations thereof, and a variety of other suitable additives. A base, such as sodium hydroxide, may be included, in some embodiment, to hydrolyze acrylamide to form acrylic acid and/or to neutralize the acrylic acid thereby forming the salt form of the friction reducing polymer. In some embodiments, a dispersant, such as poly(sodium acrylate) may be included to facilitate the dispersion of the water-based friction reducing polymer in the aqueous polymer dispersion. Certain of these additives, such as initiators and activators were included in the aqueous polymer dispersion for the polymerization of the monomers that formed the water-based friction reducing polymer.

II. Example Aqueous Treatment Fluids

The aqueous treatment fluids of the present invention generally comprise water, an anionic salt, a water-based friction reducing polymer, a polyol, an anionic surfactant, and an ionic surfactant. In accordance with the methods of the present invention, the aqueous treatment fluids of the present invention may be prepared by mixing an aqueous polymer dispersion with additional water. Because the water-based friction reducing polymer is provided in an aqueous polymer dispersion, instead of a hydrocarbon carrier fluid (e.g., an oil-external emulsion polymer), use of these water-based friction reducing polymers generally should not introduce components into the aqueous treatment fluids that may be problematic in the disposal of the treatment fluid after use. Suitable aqueous polymer dispersions for forming the aqueous treatment fluids of the present invention are described above.

Generally, the aqueous treatment fluids are not relying on viscosity for proppant transport. Where particulates (e.g., gravel particulates, proppant particulates, etc.) are included in the aqueous treatments fluids, the fluids rely on at least velocity to transport the particulates to the desired location in the formation. In some embodiments, the aqueous treatment fluid should have a viscosity in the range of from about 0.7 centipoise ("cp") to about 30 cp. In some embodiments, the aqueous treatment fluid should have a viscosity in the range of from about 1 cp to about 25 cp. For the purposes of this disclosure, viscosities are measured at room temperature using a Fann® Model 35 viscometer at 300 rpm.

The additional water that is mixed with the aqueous polymer dispersion to form the aqueous treatment fluids of the present invention may be freshwater, saltwater (e.g., water containing one or more salts dissolved therein), brine (e.g., produced from subterranean formations), seawater, or combinations thereof. Generally, the water used may be from any source, provided that it does not contain an excess of compounds that may adversely affect other components in the aqueous treatment fluid or the formation itself. For example, it is believed that high salt concentrations (e.g., saturated salt solutions) may undesirably interact with certain water-based friction reducing polymers.

The additional water is generally mixed with the aqueous polymer dispersion in an amount sufficient to provide the desired amount of the water-based friction reducing polymer in the aqueous treatment fluids of the present invention. The water-based friction reducing polymers should be included in the aqueous treatment fluids of the present invention in an amount sufficient to provide the desired reduction of friction without forming a gel. Gel formation is based on a number of factors including the particular water-based friction reducing polymer and concentration thereof, temperature, and a variety of other factors known to those of ordinary skill in the art. While the addition of friction reducing polymers may minimally increase the viscosity of the aqueous treatment fluids, the copolymers are generally not included in the aqueous treatment fluids of the present invention in an amount sufficient to substantially increase the viscosity. In some embodiments, the friction reducing polymer may be present in an amount in the range of from about 0.01% to about 1% by weight of the aqueous treatment fluid. In some embodiments, the friction reducing polymer may be present in an amount in the range of from about 0.025% to about 0.1% by weight of the aqueous treatment fluid.

Additional additives may be included in the aqueous treatment fluids of the present invention as deemed appropriate by one of ordinary skill in the art, with the benefit of this disclosure. Examples of such additives include, but are not limited to, corrosion inhibitors, proppant particulates, acids, fluid loss control additives, and surfactants. For example, an acid may be included in the aqueous treatment fluids, among other things, for a matrix or fracture acidizing treatment. In fracturing embodiments, proppant particulates may be included in the aqueous treatment fluids to prevent the fracture from closing when the hydraulic pressure is released.

III. Example Methods of the Present Invention

The aqueous treatment fluids of the present invention may be used in any subterranean treatment where friction reduction is desired. Such subterranean treatments may include, but are not limited to, drilling operations, stimulation treatments (e.g., fracturing treatments, acidizing treatments, fracture acidizing treatments), and completion operations. The compositions and methods of the present invention may be especially useful in high-rate water fracturing treatments. Those of ordinary skill in the art, with the benefit of this disclosure, will be able to recognize a suitable subterranean treatment where friction reduction may be desired.

In some embodiments, the present invention provides a method of treating a subterranean formation. Such a method comprises providing an aqueous polymer dispersion that comprises water, a water-based friction reducing polymer, a polyol, an anionic salt, an anionic surfactant, and a nonionic surfactant. The method further comprises mixing the aqueous polymer dispersion with additional water to form an aqueous treatment fluid of the present invention. The method further comprises introducing the aqueous treatment fluid of the present invention into the subterranean formation. In some embodiments, the aqueous treatment fluid may be introduced into the subterranean formation at or above a pressure sufficient to create or enhance one or more fractures in the subterranean formation. In some embodiments, the aqueous treatment fluid may be introduced into the subterranean formation at a rate in the range of from about 30 barrels per minutes ("bpm") to about 250 bpm. In some embodiments, the rate may be in the range of from about 50 bpm to about 175 bpm.

Another method of treating a subterranean formation may comprise providing an aqueous treatment fluid of the present invention that comprises water, an anionic salt, a water-based friction reducing polymer, a polyol, an anionic surfactant, and an ionic surfactant; and introducing the aqueous treatment fluid into the subterranean formation. In some embodiments, the aqueous treatment fluid may be introduced into the subterranean formation at or above a rate and pressure sufficient to create or enhance one or more fractures in the subterranean formation. In some embodiments, the aqueous treatment fluid may be introduced into the subterranean formation at a rate in the range of from about 30 bpm to about 250 bpm. In some embodiments, the rate may be in the range of from about 50 bpm to about 175 bpm.

To facilitate a better understanding of the present invention, the following examples of certain aspects of some embodiments are given. In no way should the following examples be read to limit, or define, the scope of the invention.

EXAMPLE 1

An aqueous polymer dispersion that comprised a water-based friction reducing polymer was prepared in accordance with the following procedure. First, a 1.5 liter resin reactor equipped with a stirrer, temperature controller, and a water cooled condenser was charged with 520 grams ("g") of deionized water. To the water, 290 g of ammonium sulfate, 20 g of poly(sodium acrylate), 3 g of an anionic surfactant, 1 g of an ionic surfactant, 112.65 g of dry acrylamide, 17.7 g of acrylic acid, and 19.7 g of 50% sodium hydroxide by weight were added. The anionic surfactant was polyester polyol. The ionic surfactant was an ammonium salt of polyacrylic acid. Next, 3 g of sodium bisulfite, 1 g of potassium persulfate, and 2 g of ammonium sulfate were added. The solution was sparged with 1,000 cubic centimeters per minute of nitrogen. Polymerization was initiated as indicated by the production of exothermic heat. The solution was held at a temperature of from about 40° C. to about 45° C. for a period of about 16 hours. Thereafter, the reaction mixture was cooled to room temperature and 3 g of glycerin were added.

EXAMPLE 2

Friction reduction tests were performed to compare the performance of the water-based friction reducing polymer prepared in accordance with Example 1 to an oil-external emulsion polymer.

Test No. 1 was performed using an aqueous polymer dispersion prepared in accordance with Example 1. In Test No. 1, 1 gallon of the aqueous polymer dispersion (15% active polymer) per 1,000 gallons of tap water ("gpt") was used.

Test No. 2 (comparative) was performed using an oil-external emulsion polymer (30% active polymer) in an amount of 0.5 gpt. The oil-external emulsion polymer comprised partially hydrolyzed acrylamide.

These friction reduction tests were performed using a Friction Reduction Meter ("FR Meter") in accordance with the procedure listed below. The FR Meter was a closed loop pipeline apparatus designed to measure the pressure drop across a 5-foot section of a 12-foot commercial steel pipe. The commercial steel pipe had an inner diameter of 0.632 inches with a wall roughness of 0.00011 feet. The FR Meter consisted of a storage/mixing tank connected to a fixed speed progressive cavity pump which pumped the test fluid through a magnetic flow meter then through the test pipes and a return line to the storage/mixing tank.

For each test, about 10 liters of tap water were added to the storage/mixing tank. Next, the pump was run to circulate the tap water for an amount of time sufficient to fill all the pipes with water. Once the pipes were filled with water, the pump was stopped. The data acquisition system was started, and the pump was started after about an additional 10 to 15 seconds. The data acquisition system measured the flow rate, tank temperature, and pressure drop across the 5-foot section of pipe. At about 1 minute into the test, the desired quantity of the aqueous polymer dispersion (1 gpt) for Test No. 1, or oil-external emulsion polymer (0.5 gpt gal) for Test No. 2, was added to the storage/mixing tank. Each test was run for a total of about 20 minutes, with flow rate, tank temperature, and pressure drop across the 5-foot section of pipe recorded at one-second intervals. The pump rate was about 30 liters per minute, or 3 system volumes per minute. For the commercial steel pipe, the flow was fully turbulent at a Reynolds Number of about 50,000.

The first minute of data that was collected prior to the addition of the aqueous polymer dispersion or oil-external emulsion polymer was used to verify instrument readings and provide a baseline of data with a known fluid. The pressure drop across the 5-foot section of pipe for the freshwater, was calculated from the flow rate and pipe dimensions in accordance with the following formula:

$$\Delta P_{water} = \frac{\rho V^2 Lf}{2g_c D_h}$$

wherein $\Delta P_{water}$ is the calculated pressure drop for the water, $\rho$ is density, V is the velocity, L is length, $g_c$ is the gravitational constant, and $D_h$ is the pipe diameter. The variable $f$ was calculated in accordance with the formula below for turbulent flow.

$$f = \left\{-2\log\left[\frac{\varepsilon/d}{3.7} - \frac{5.02}{N_{Re}}\log\left(\frac{\varepsilon/d}{3.7} + \frac{14.5}{N_{Re}}\right)\right]\right\}^{-2}$$

wherein $\varepsilon$ is pipe roughness, d is the pipe diameter, and $N_{Re}$ is the Reynold's Number (Shacham, M., *Isr. Chem. Eng.*, 8, 7E (1976)).

Following the addition of the aqueous polymer dispersion and/or the oil-external emulsion polymer to the tank, the measured pressure drop, was compared to the calculated pressure drop for the water to determine the % Friction Reduction ("% FR") using the following equation:

$$\% FR = 1 - \frac{\Delta P_{measured}}{\Delta P_{water}}$$

wherein $\Delta P_{water}$ is the calculated pressure drop for the water and $\Delta P_{measured}$ is the measured pressure drop after introduction of the oil-external emulsion polymer.

The results of this series of test are shown in Table 1 below.

TABLE 1

Friction Reduction Tests

| Measured Parameter | Test No. 1 Aqueous Polymer Dispersion, 1 gpt (15% Active) | Test No. 2 Oil-External Emulsion Polymer, 0.5 gpt (30% Active) |
|---|---|---|
| % FR at 4 min. | 56.76 | 57.96 |
| % FR at 9 min. | 49.36 | 52.29 |
| % FR at 14 min. | 43.75 | 48.53 |
| % FR at 19 min. | 39.43 | 48.53 |
| Maximum % FR | 69.0 | 64.12 |
| Time to 90% of Max (sec) | 4 | 11 |
| Time at 90% of Max (sec) | 89 | 232 |

The maximum friction reduction and percent friction reduction at various times may be used to compare the relative performance of the aqueous polymer dispersion and the oil-external emulsion polymer. The start time for these measurements was when the aqueous polymer dispersion/oil-external emulsion polymer was added to the storage/mixing tank.

These examples thus show that an aqueous polymer dispersion comprising a water-based friction reducing polymer may provide friction reduction comparable to an oil-external emulsion polymer comprising a friction reducing polymer.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method comprising:
    providing an aqueous polymer dispersion comprising water, an anionic salt, a water-based friction reducing polymer, a polyol, an anionic surfactant, and a nonionic surfactant, wherein the water-based friction reducing polymer comprises acrylamide;
    mixing the aqueous polymer dispersion with additional water to form an aqueous treatment fluid; and
    introducing the aqueous treatment fluid into a subterranean formation.

2. The method of claim 1 wherein the water-based friction reducing polymer comprising the acrylamide is partially hydrolyzed polyacrylamide.

3. The method of claim 1 wherein the water-based friction reducing polymer is a copolymer comprising acrylamide and acrylic acid.

4. The method of claim 3 wherein the acrylamide is present in the friction reducing polymer in an amount in the range of from about 60% to about 90% by weight of the friction reducing polymer, and the acrylic acid is present in the friction reducing polymer in an amount in the range of from about 10% to about 30% by weight of the friction reducing polymer.

5. The method of claim 1 wherein the water-based friction reducing polymer is a copolymer comprising acrylamide and at least one monomer selected from the following group: acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, diallyl dimethyl ammonium chloride, and combinations thereof.

6. The method of claim 1 wherein the polyol is selected from the group consisting of glycerin, propylene glycol, ethylene glycol, and combinations thereof.

7. The method of claim 1 wherein the nonionic surfactant is selected from the group consisting of a polyester polyol, an aliphatic alcohol ester, an aromatic alcohol ester, and combinations thereof.

8. The method of claim 1 wherein the anionic surfactant is selected from the group consisting of an ammonium salt of polyacrylic acid, an ammonium salt of a 2-acrylamido-2-methylpropane sulfonic acid/acrylic acid copolymer, and combinations thereof.

9. The method of claim 1 wherein:
    the water-based friction reducing polymer is a copolymer comprising acrylamide and acrylic acid;
    the polyol comprises glycerin;
    the nonionic surfactant comprises a polyester polyol; and
    the anionic surfactant comprises an ammonium salt of polyacrylic acid.

10. The method of claim 1 wherein the water-based friction reducing polymer is present in the aqueous treatment fluid in an amount sufficient to reduce friction without forming a gel.

11. The method of claim 1 wherein the water-based friction reducing polymer is present in the aqueous treatment fluid in an amount in the range of from about 0.01% to about 1% by weight of the aqueous treatment fluid.

12. The method of claim 1 wherein the aqueous treatment fluid has a viscosity in the range of from about 0.7 centipoise to about 30 centipoise.

13. The method of claim 1 wherein the aqueous treatment fluid is introduced into the formation at rate in the range of from about 30 barrels per minute to about 250 barrels per minute.

14. The method of claim 1 wherein the aqueous treatment fluid is introduced into the formation at or above a pressure sufficient to create one or more fractures in the subterranean formation.

15. The method of claim 1 wherein the aqueous polymer dispersion was prepared by solution polymerization, wherein the water-based friction reducing polymer is present in the aqueous polymer dispersion in an amount in the range of from about 5% to about 30% by weight of the dispersion, wherein the polyol is present in the aqueous polymer dispersion in an amount in the range of from about 0.01% to about 0.5% by weight of the dispersion, wherein the anionic surfactant is present in the aqueous polymer dispersion in an amount in the range of from about 0.001% to about 0.5% by weight of the dispersion, and wherein the nonionic surfactant is present in the aqueous polymer dispersion in an amount in the range of from about 0.01% to about 0.5% by weight of the dispersion.

16. The method of claim 1 wherein the aqueous treatment fluid comprises proppant particulates.

17. A method of fracturing a subterranean formation comprising:

providing an aqueous polymer dispersion comprising water, an anionic salt, a water-based friction reducing polymer, a polyol, an anionic surfactant, and a nonionic surfactant, wherein the water-based friction reducing polymer is a copolymer comprising acrylamide and acrylic acid, and mixing the aqueous polymer dispersion with additional water to form an aqueous treatment fluid, wherein the water-based friction reducing polymer is present in the aqueous treatment fluid in an amount sufficient to reduce friction without forming a gel; and introducing the aqueous treatment fluid into the subterranean formation at or above a pressure sufficient to create one or more fractures in the subterranean formation.

* * * * *